United States Patent [19]

Tatsuguchi et al.

[11] 4,152,727
[45] May 1, 1979

[54] REPRODUCING TRANSDUCER CAPABLE OF TRACKING CONTROL

[75] Inventors: Kazuo Tatsuguchi; Hisao Kinjo, both of Yokohama City, Japan

[73] Assignee: Victor Company of Japan, Ltd., Yokohama, Japan

[21] Appl. No.: 841,531

[22] Filed: Oct. 11, 1977

[30] Foreign Application Priority Data

Oct. 14, 1976 [JP] Japan .................. 51-123285

[51] Int. Cl.² .................. H04N 5/80; G11B 21/10
[52] U.S. Cl. .................. 358/128; 179/100.1 B; 360/77
[58] Field of Search ............. 358/128; 179/100.3 V, 179/100.1 B, 100.41 D, 100.41 R, 100.41 G; 360/77, 109; 310/12, 13; 274/23 R, 37

[56] References Cited

U.S. PATENT DOCUMENTS

| 3,207,857 | 9/1965 | Poutot | 179/100.41 D |
| 3,872,241 | 3/1975 | Adler | 179/100.1 B |
| 3,973,080 | 8/1976 | Dickopp | 358/128 |
| 4,001,889 | 1/1977 | Schneider | 310/13 |
| 4,059,277 | 11/1977 | De Stephanis | 358/128 |

Primary Examiner—Bernard Konick
Assistant Examiner—Alan Faber
Attorney, Agent, or Firm—Haseltine, Lake & Waters

[57] ABSTRACT

A reproducing transducer, in an apparatus for reproducing an information signal recorded on a track on a rotary recording medium, comprises a reproducing tracing element for tracing the track on the rotary recording medium thereby to reproduce the information signal, a cantilever supported at a proximal end thereof by way of a damper and provided at a free distal end thereof with the reproducing tracing element, a mechanism for detecting any deviation of the tracing position of the reproducing tracing element from a proper tracing position relative to the track and generating a tracking control signal in response to the deviation. A unit supplies the current of the tracking control signal to the cantilever or an electric conductor secured to the cantilever, and a permanent magnet applies a magnetic field to the cantilever or the electric conductor. The cantilever or the electric conductor undergoes a displacement within the magnetic field in response to the direction and magnitude of the tracking control signal current thus supplied, whereby the reproducing tracing element is displaced so as to trace the track in the proper tracing position and is thereby tracking controlled.

9 Claims, 17 Drawing Figures

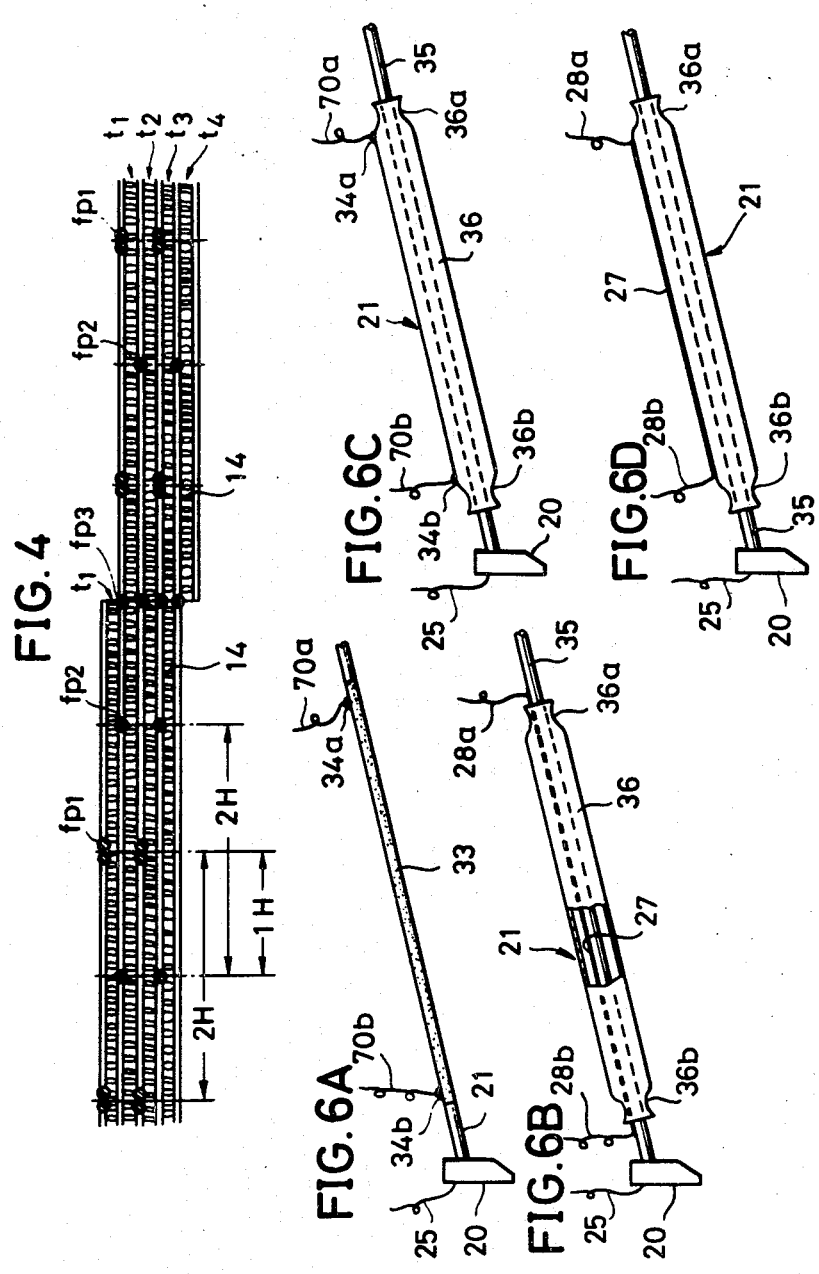

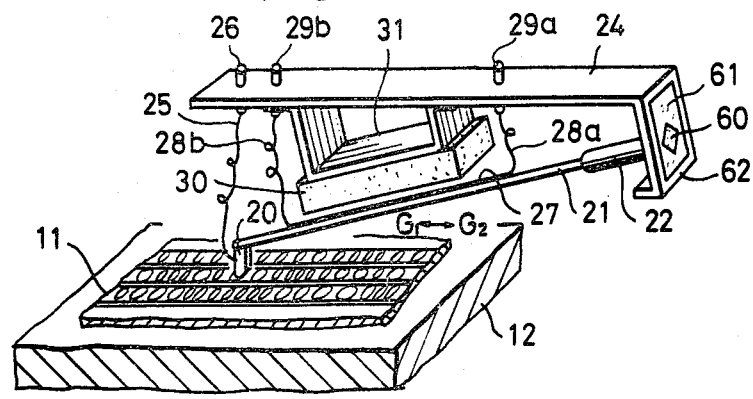
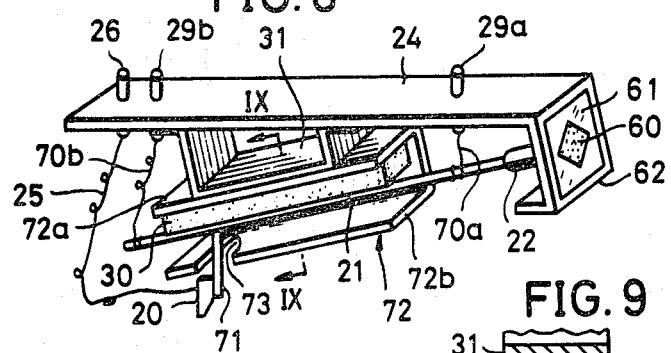
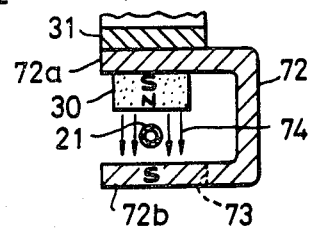
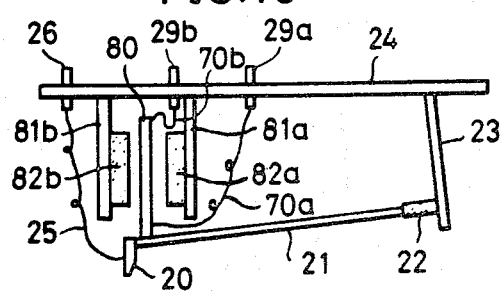

REPRODUCING TRANSDUCER CAPABLE OF TRACKING CONTROL

BACKGROUND OF THE INVENTION

The present invention relates to reproducing transducers having tracking control functions in apparatus for reproducing recorded signals from rotary recording mediums. More particularly, the invention relates to a reproducing transducer capable of tracking control, in an apparatus for reproducing a video signal from a rotary disc on which the video signal has been recorded on a spiral track or concentric circular tracks, in a manner such that a reproducing tracing element for reproducing the video signal accurately traces on the track.

Heretofore, there have been apparatuses of the type wherein, for example, a rotary disc on which a video signal has been recorded on a spiral track as variations in the geometrical shapes corresponding to an information content is rotated, and a reproducing transducer is caused to trace the spiral track thereby to reproduce the recorded video signal. In a reproducing apparatus of this character, it is necessary that the reproducing transducer trace the track accurately. For this reason, it is necessary to provide means for detecting any tracking deviation of the reproducing transducer relative to the above mentioned track on the rotary disc and controlling, in response to this error, the position of the reproducing transducer so that it will trace accurately over the track thereby to accomplish tracking control.

In U.S. patent application Ser. No. 785,095, entitled "Information signal recording and reproducing system", assigned to the same assignee as the present application a novel system is disclosed wherein pilot signals are previously recorded on the track of the rotary disc or in the vicinity thereof. Then, at the time of reproduction, the pilot signals are reproduced together with the video signal, and tracking of the reproducing transducer is carried out in response to the reproduced pilot signals. In this proposed system, the system for recording and reproducing the pilot signals is novel.

However, as can be observed also in this proposed system, the tracking control device comprises, as one example, a coil supplied with an error signal obtained on the basis of the above mentioned reproduced pilot signals, a support member on which is mounted a cantilever over a damping member interposed therebetween, the cantilever being provided at its outer end with a reproducing tracing element, and a movable shaft coupled to the support member and undergoing displacement in response to a current flowing through the above mentioned coil has heretofore been employed. In this device, the movable shaft undergoes displacement unitarily with the support member in response to the error signal flowing through the coil, and, as a consequence, the reproducing tracing element is displaced in the direction transverse to the longitudinal direction and is tracking controlled so as to trace accurately over the track.

This tracking control device, however, has been accompanied by the following difficulties. Since the damper member, the cantilever, and the like which are easily deformed are interposed between the movable shaft driven directly by the above mentioned coil and the reproducing tracing element for tracing the track, the reproducing tracing element cannot always undergo displacement unitarily relative to the displacement of the movable shaft, and accurate tracking control cannot be carried out. Furthermore, since the support member is adapted to be displaced in the direction transverse to the longitudinal direction of the track, it is difficult to adapt the support member to be capable of being displaced also in the longitudinal direction of the track. For this reason, it has heretofore been difficult to use a jitter compensation device for causing the reproducing tracing element to undergo displacement in the longitudinal direction of the track in combination with the above described tracking control device.

SUMMARY OF THE INVENTION

Accordingly, it is a general object of the present invention to provide a novel and useful reproducing transducer capable of a tracking control in an apparatus for reproducing recorded signals from a rotary recording medium, in which the above described difficulties have been overcome.

Another and specific object of the invention is to provide a reproducing transducer for directly causing a cantilever having a reproducing tracing element at the outer end thereof to undergo displacement and carry out tracking control of the reproducing tracing element. In accordance with the present invention, it is possible, with a device of simple organization, to carry out tracking control very accurately. Furthermore, this reproducing transducer can be readily used in combination with a jitter compensation device.

Still another object of the invention is to provide a reproducing transducer in which a cantilever having at its outer end a reproducing tracing element is provided with a very thin filament or wire, and a magnet for applying a magnetic field to this filament or wire is provided on a stationary side, by which arrangement a signal current responsive to any tracking error is caused to flow through the wire thereby to cause the cantilever to be displaced together with the reproducing tracing element and thereby to accomplish tracking control.

Other objects and further features of the present invention will be apparent from the following detailed description with respect to preferred embodiments of the invention when read in conjunction with the accompanying drawings.

BRIEF DESCRIPTION OF THE DRAWINGS

In the drawings:

FIG. 4 is a fragmentary, enlarged plan view showing one example of a track pattern on a rotary disc;

FIGS. 6A, 6B, 6C, and 6D are side views respectively showing various modifications of an essential part of the reproducing transducer illustrated in FIG. 2;

FIG. 7 is a perspective view showing a further modification of the transducer illustrated in FIG. 2;

FIG. 8 is a perspective view of a reproducing transducer constituting a second embodiment of the invention;

FIG. 9 is a vertical section taken along line IX—IX in FIG. 8 for a description of the principle of operation of the transducer shown in FIG. 8;

FIG. 10 is a side elevation over of a reproducing transducer constituting a third embodiment of the invention;

DETAILED DESCRIPTION

Figure 1:
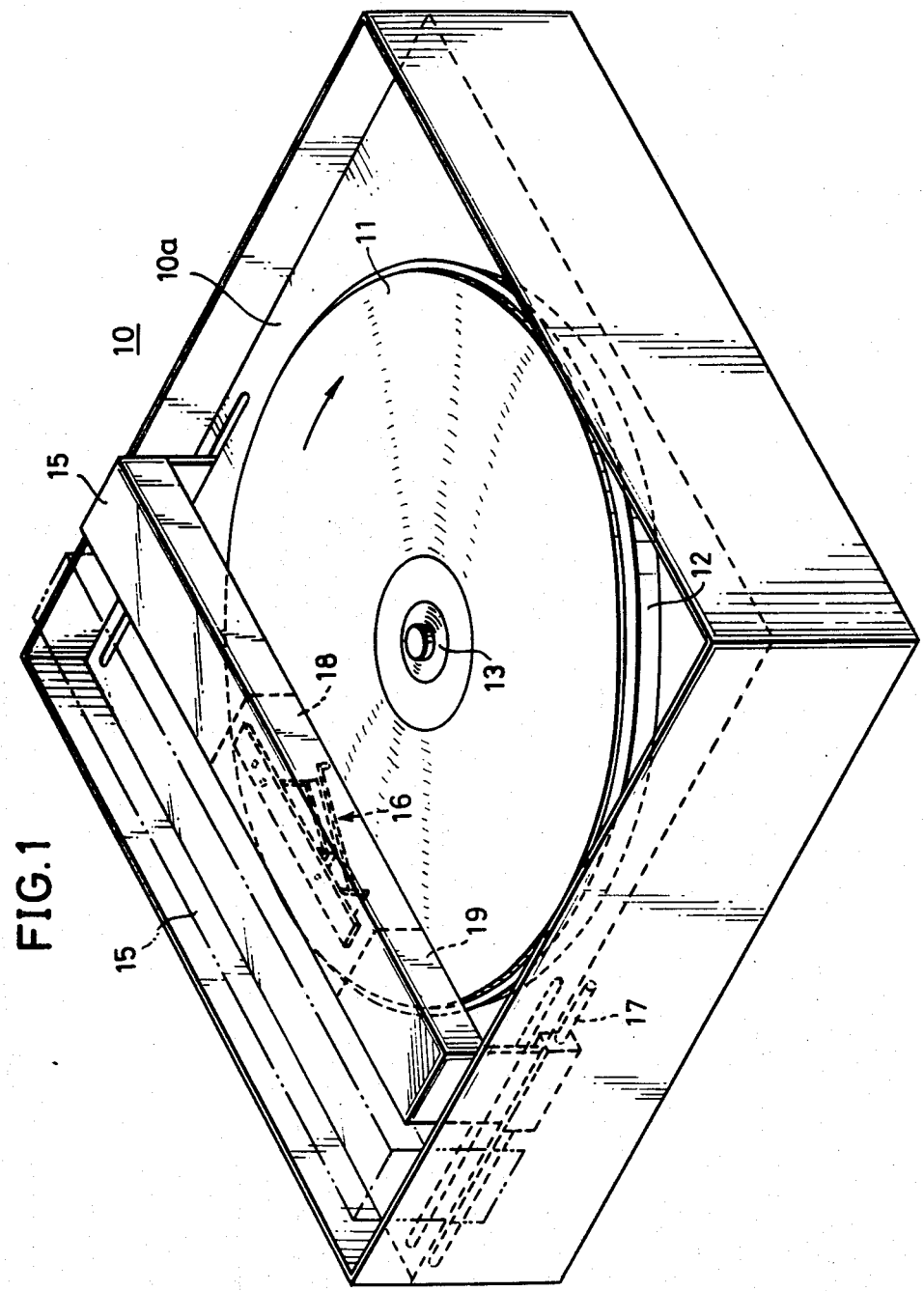
FIG. 1 is a perspective view showing the general exterior of one example of an apparatus for reproducing a rotating recording medium in which the reproducing transducer capable of tracking control according to the present invention can be applied.

The general features of the exterior of a reproducing apparatus 10 for reproducing a rotary recording medium, in which a reproducing transducer according to the invention is applied, is illustrated in FIG. 1. In this apparatus 10, a rotary disc 11, constituting the rotary recording medium and having a video signal recorded thereon, is set on a turntable 12 and clamped thereon by a clamper 13 and is thus rotated unitarily with the turntable 12 at a rotational speed of 900 rpm. On this rotary disc 11, a video signal of two frames, that is, four fields, per revolution with spiral tracks is recorded with pits formed responsive to the information content of the signal.

One part of this track is shown on an enlarged scale in FIG. 4. For example, as set forth in the above cited prior application, two pilot signals fp1 and fp2 for tracking control of mutual different frequencies are recorded alternately every horizontal tracing period (H) on the opposite sides of each of the video signal tracks t1, t2, . . . . The sides on which the pilot signals fp1 and fp2 are recorded are reversed every adjacent track. In each track, pits 14 are formed in accordance with the information content of the recorded video signal.

Referring again to FIG. 1, a reproducing transducer 16 is mounted at a re-entrant cylindrical cavity resonator 18 provided within a carrier 15 and connected to a central conductor (not shown) of the resonator. The central conductor is electro-magnetically connected to a high frequency oscillator 19 for producing an oscillation of frequency of 1 GHz, for example. This organization is well known. The carrier 15, which is disposed horizontally above the turntable 12, is guided at its ends by a pair of parallel horizontal guide bars 17 (only one shown) provided below a base plate 10a. This carrier 15, driven by a driving mechanism (not shown), moves continuously in horizontal translation at a speed of the distance of one track pitch per revolution of the turntable 12 in synchronism with the rotation thereof. As a result of this movement of the carrier 15, a reproducing tracing element of the reproducing transducer 16 travels in translation relative to the rotary disc 11 along the radial direction thereof and traces the spiral track of the rotary disc 11 undergoing rotation.

A first embodiment of a reproducing transducer of the invention will now be described with reference to FIG. 2. A cantilever 21 having at its free end a reproducing tracing element 20 is mounted at its proximal end via a damper 22 on a bracket 23. The bracket 23 is secured to a support plate 24 mounted on the re-entrant cylindrical cavity resonator 18.

The reproducing tracing element 20 is of known construction, comprising a stylus structure made of diamond or sapphire and an electrode consisting of an electroconductive film adhered onto the end face of the stylus structure. This electrode is connected through a very thin lead wire 25 which is flexible and slackened to a terminal 26 provided on the support plate 24. As the reproducing tracing element 20 traces along a track on the rotary disc 11, the video signal recorded thereon as a variation of pits is reproduced as a variation in the electrostatic capacitance between the surface of the rotary disc 11 and the electrode of the reproducing tracing element 20.

The cantilever 21 may be a glass rod, but is preferably formed of a material which is light and has high rigidity. In the case of the present embodiment of the invention, the cantilever is formed from an aluminium tube which has been subjected to alumite treatment. Since the reproducing tracing element 20 contacts the rotary disc 11 with a stylus pressure of 20–30 mg and the proximal or root end of the cantilever 21 is supported through a damper 22, the reproducing tracing element 20 traces accurately and positively along the track even when there are oscillations of the surface of the rotating disc 11. In this connection, in the case where there are fluctuations of the rotating surface of the rotary disc 11, the reproducing tracing element 20 moves in a path as viewed in side view which is, strictly speaking, an arc of a circle. However, since the amplitude of the rotating surface fluctuation is of the order of 100 $\mu$m, it may be assumed, when the length of the cantilever 21 is selected at a value of the order of 30 mm., for example, that the reproducing tracing element 20 undergoes an up-and-down movement following displacement in a substantially straight line in conformance with the rotating surface fluctuation.

A very thin gold wire 27 of a diameter of the order of 20 $\mu$m, for example, is bonded, except at its ends, by an instantaneous adhesive to the cantilever 21 over a specific distance in the longitudinal direction thereof. Lead wire parts 28a and 28b of the end parts of this gold wire 27 are respectively connected in a slackened state to terminals 29a and 29b provided on the support plate 24. A gold wire of a diameter of 18 $\mu$m or 24 $\mu$m may be employed as the wire 27. As the instantaneous adhesive, may be employed an Aron-alpha adhesive (tradename, produced by Toa Gosei Kagaku Kogyo Corp.) of a monomer of alpha syano acrylate.

Figure 3:
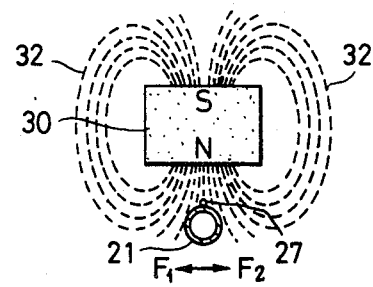
FIG. 3 is a vertical section taken along the line III—III in FIG. 2 for a description of the principle of operation of the tracking control of the transducer illustrated in FIG. 2.

A permanent magnet 30 is secured by way of a bracket 31 to the lower surface of the support plate 24 and is thus so positioned that it confronts the wire 27 bonded to the cantilever 21 with a very small gap therebetween along the extension direction of the wire 27. As shown in FIG. 3, this magnet 30 has magnetic poles on the upper and lower sides thereof and establishes a magnetic field as indicated by lines of magnetic force 32. The wire 27 is thus disposed in this strong magnetic field formed by the magnet 30.

Figure 5:
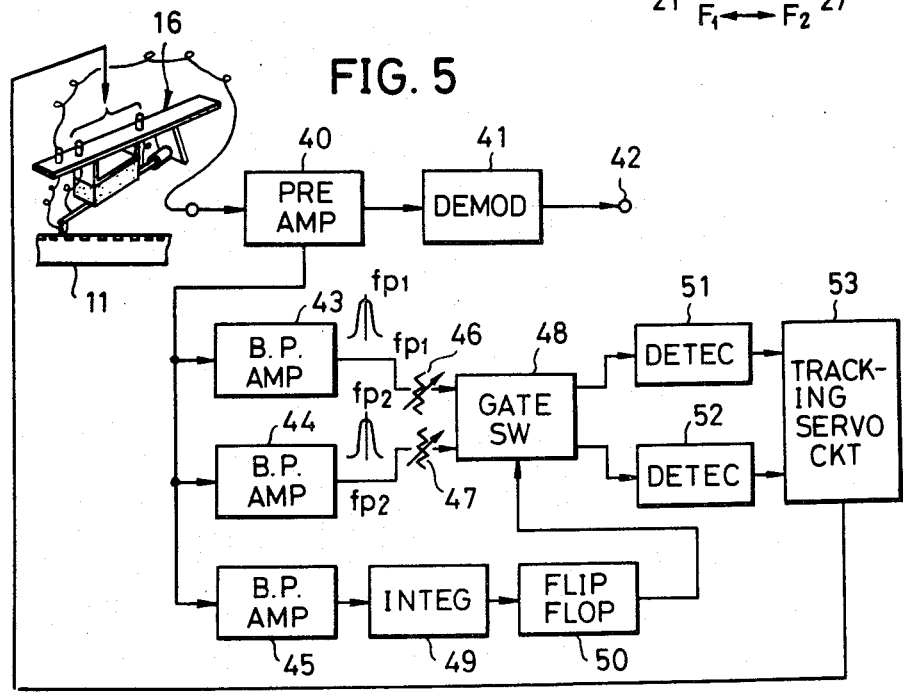
FIG. 5 is a block schematic diagram of one example of a tracking servo control circuit.

At the time of reproduction, the rotary disc 11 rotates, and the reproducing tracing element 20 traces the tracks t1, t2, . . . , whereupon the recorded video signal and the pilot signals fp1 and fp2 are reproduced through the reproducing tracing element 20. The reproduced signal thus picked up is supplied to the circuit of the block schematic diagram of FIG. 5, which is described in detail in the specification of the aforementioned prior application. A reproduced signal is supplied to a preamplifier 40 having a resonant circuit. The resonant frequency varies in response to this variation in electrostatic capacitance and is formed into a signal of a desired level. The resulting output of the preamplifier 40, is demodulated into the original information signal by a demodulator 41 and is sent out as an output through an output terminal 42.

The output signal of the preamplifier 40, is supplied respectively to amplifiers 43, 44, and 45. Here, each of the amplifiers 43 and 44 is a kind of band-pass amplifier. The amplifier 43 is designed to have a steep passing frequency characteristic at only the frequency fp1. The amplifier 44 is designed to have a steep passing frequency characteristic at only the frequency fp2. The pilot signal of frequency fp1 and the pilot signal of frequency fp2 obtained separately from the amplifiers 43 and 44, respectively pass through level adjustors 46 and 47 and are then supplied to a gate switching circuit 48. These reproduced pilot signals fp1 and fp2 are pulse trains of 2H period. Moreover, they have a coinciding phase in the horizontal blanking period of the reproduced video signal.

A pilot signal of frequency fp3 reproduced from a track changing position is separately amplified by the band-pass amplifier 45 having a band-pass filter characteristic and is then supplied to an integration circuit 49. There, its wave is shaped so that it is not affected by noise and other influences. The wave-shaped signal is then applied to trigger a flip-flop 50. The resulting output of the flip-flop 50 is applied to the gate switching circuit 48 as a gate switching pulse.

The gate switching circuit 48 switches the signals fp1 and fp2 every revolution period of the rotary disc 11 with the supplied switching pulse. The signals fp1 and fp2 derived from the gate switching circuit 48 are supplied alternately in every two frame period to detecting circuits 51 and 52.

The detecting circuits 51 and 52 detect the envelopes of their respective input reference signals and convert the envelopes into DC voltages. These voltages are then supplied to the input terminals of differential amplifiers (not shown) within a tracking servo circuit 53. This tracking servo circuit 53 compares the output signals of the two detecting circuits 51 and 52 which vary in response to the reproduced levels of the signals fp1 and fp2. This generates an output tracking error signal which indicates the tracking error direction and the error quantity. This error signal is further amplified to a specific level by known circuitry. Then, it is applied between the terminals 29a and 29b.

Here, when the tracing position of the reproducing tracing element 20 deviates from the proper tracing track toward the side of an adjacent track, the level of one of the reproducing pilot signals fp1 and fp2 becomes higher than that of the other pilot signal. A level difference is then produced between the output signals of the detection circuits 51 and 52. From the tracking servo circuit 53, a control signal current in accordance with the level difference of the output signals of the detection circuits 51 and 52 is led out.

When a control signal current flows through the terminals 29a and 29b and through the wire 27, a displacement force acts on the wire 27 in the transverse direction perpendicular to the longitudinal direction of the cantilever 21 as indicated by arrows F1 and F2 in response to the direction and magnitude of the above mentioned current according to Fleming's left-hand rule since the wire 27 is disposed within the magnetic field due to the magnet 30 as shown in FIG. 3. Since the wire 27 is bonded to the cantilever 21, the cantilever 21 is displaced in the direction of arrow F1 or F2 by the force acting on the wire 27. As a result, the reproducing tracing element 20 is displaced in a direction perpendicular to the longitudinal direction of the track, and tracking control is so accomplished that the tracing element 20 accurately traces along the track.

Various modifications of the essential part of the reproducing transducer of the invention will be described hereinafter. In a modification illustrated in FIG. 6A, an electrically conductive layer 33 is formed, on the outer peripheral surface of the cantilever 21 consisting of a glass rod or an aluminium pipe which has been subjected to alumite treatment, by vaporization of a conductive material such as titanium, aluminium, or copper. Lead wires 70a and 70b are bonded and electrically connected to the conductive layer 33 by means of conductive adhesives 34a and 34b such as silver paste. The conductive layer 33 assumes the function of the wire 27. In a modification illustrated in FIG. 6B, the cantilever 21 consists of a glass rod 35 which is provided with the tracing element 20 at the foremost end thereof and an aluminium pipe 36 which covers the glass rod 35. The gold wire 27, which has been bonded on the glass rod 35, extends within the aluminium pipe 36. Both ends 36a and 36b of the aluminium pipe 36 are caulked to the glass rod 35 to be integrated therewith. In FIG. 6C, the cantilever 21 consists of the glass rod 35 and the aluminium pipe 36 whose ends 36a and 36b are caulked to the glass rod 35. The lead wires 70a and 70b are bonded and electrically connected to the aluminium pipe 36 by means of conductive adhesives 34a and 34b. In FIG. 6D, the gold wire 27 is bonded to the outer surface of the aluminium pipe 36 through which the glass rod 35 extends.

In accordance with the present invention, since the cantilever is caused directly to undergo displacement for tracking control, it can be easily combined and used with a jitter correction mechanism. One example of this arrangement is shown in FIG. 7. In FIG. 7, those parts which are the same as corresponding parts in FIG. 2 are designated by like reference numerals, and detailed description of such parts will be omitted. The cantilever 21 is secured at its proximal or root end by way of the damper 22 to a magnet plate 60. This magnet plate 60 is held by a thin rubber membrane for damping action 61 secured to the bracket 62 fixed to the support plate 24 and functioning as a damper. The magnet plate 60 operates cooperatively with a reproduction time axis compensation device of known type (not shown) to cause the cantilever 21 to undergo displacement together with the reproducing tracing element 20 in the directions of arrows G1 and G2, that is, in the longitudinal direction of the track, in response to the generation of jitter. As a result, excellent jitter correction can be accomplished without any effect on the above described tracking control. The tracking control operation is the same as that in the embodiment of the invention illustrated in FIG. 2.

A second embodiment of the invention will now be described in conjunction with FIGS. 8 and 9. In FIG. 8, those parts which are the same as corresponding parts in FIGS. 2 and 7 are designated by like reference numerals, and detailed description of such parts will not be repeated. The lead wires 70a and 70b connected to the terminals 29a and 29b are respectively bonded and connected to the cantilever 21 of the aluminium pipe by means of silver paste at the positions shown. A connecting tube 71 of insulative material provided at its lower end with the reproducing tracing element 20 is connected at its upper end to the cantilever 21. The upper flange 72a of a channel-shaped yoke 72 having a U-shape cross section and lying on its side is fixed to the lower part of the bracket 31. A permanent magnet 30 is fixed to the lower surface of the upper flange 72a of the yoke 72. The lower flange 72b of the yoke 72 is provided with a cutout recess 73 for enabling the connecting tube 71 to move freely without obstruction. The cantilever 21 is supported to extend between the permanent magnet 30 and the lower flange 72b of the yoke 72. The magnetic flux of the magnet 30 flows through the yoke 72, whereby a closed magnetic circuit passing through the yoke 72 is formed, and, as indicated in FIG. 9, a magnetic field 74 is established in the space between the magnet 30 and the lower flange 72b in which the cantilever 21 is disposed.

In the present embodiment of the invention, a greater concentration of magnetic flux in the space surrounding the cantilever 21 is obtained by virtue of the yoke 72 than in the device of the preceding embodiment, and, therefore, a strong magnetic field 74 can be effectively established. Since the tracking control operation is similar to that of the preceding embodiment of the invention, description thereof will be omitted. It is to be noted, however, that since the magnetic field 74 is strong, when a tracking control current flows through the cantilever, a relatively large displacing force acts, and tracking control is accomplished faithfully and with high precision.

In the present embodiment of the invention, the yoke 72 may have the shape of a hollow square tube of rectangular cross section instead of the channel shape of U-shape lying on its side as described above. In this case, a fully closed magnetic circuit is formed. As another possible modification, an arrangement wherein the yoke 72 of channel shape is formed from a non-magnetic material and provided with the magnet 30 on the lower surface of its upper flange 72a as in the previously described example, and another magnet is so provided on the lower flange 72b that its poles confront mutual different poles of the magnet 30, the cantilever 21 extending between the two magnets, may be used.

In a third embodiment of the invention as illustrated in FIG. 10, an upwardly extending electric conductor 80 is fixed at its lower end to the free end of the cantilever 21. The lead wires 70a and 70b connected to terminals 29a and 29b are connected at their other ends to the lower and upper ends of the electric conductor 80. A pair of substantially parallel and spaced mounting plates 81a and 81b are fixed to the lower surface of the support plate 24 at positions on opposite sides of the electric conductor 80. A pair of permanent magnets 82a and 82b are mounted on the mutually facing surfaces of the mounting plates 81a and 81b with the electric conductor 80 interposed therebetween, the magnetic poles of one of the magnets facing opposite poles of the other magnet.

When a tracking signal flows through the conductor 80 through the lead wires 70a and 70b, the conductor 80 is subjected to a force urging it to undergo a displacement in the transverse direction perpendicular to the magnetic flux as a result of the existence of the magnetic field established between the magnets 82a and 82b. As a consequence, this displacing force is transmitted from the conductor 80, through the cantilever 21, to the reproducing tracing element 20, whereby the tracking control is accomplished.

Figure 11:
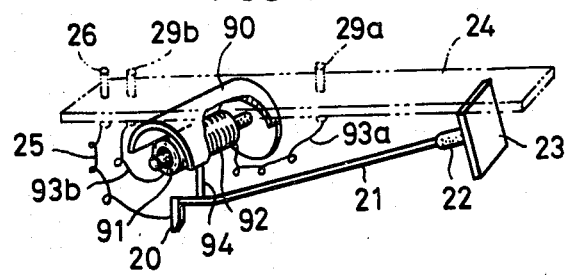
FIG. 11 is a perspective view, with a part cut away, showing the essential parts of a reproducing transducer constituting a fourth embodiment of the invention.

In a fourth embodiment of the invention as shown in FIG. 11, a semi-cylindrical yoke 90 is fixed to the lower surface of the support plate 24, and at its center, a bar magnet 91 is fixedly supported and extends in the lateral direction perpendicular to the longitudinal direction of the cantilever 21. Around this bar magnet 91 is concentrically disposed a moving coil 92 of hollow cylindrical shape with a very small spacing gap therebetween. Lead wires 93a and 93b respectively connect the two ends of the moving coil 92 to the terminals 29a and 29b. The moving coil 92 is mounted by way of a connecting tube 94 to the cantilever 21 at a part near the free end thereof. The bar magnet 91 has magnetic poles at its both ends.

When a tracking control signal is passed through the moving coil 92 by way of the lead wires 93a and 93b, the moving coil 92 undergoes displacement along the bar magnet 91 in accordance with the direction and magnitude of this signal current, and, thus, tracking control of the reproducing tracing element 20 is accomplished.

Figure 12:
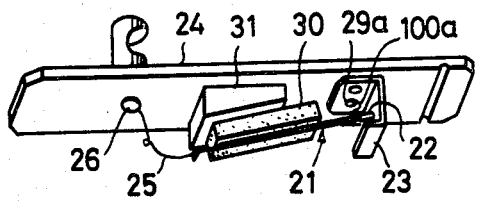
FIG. 12 is perspective view showing a fifth embodiment of a reproducing transducer of the invention.
Figure 13:
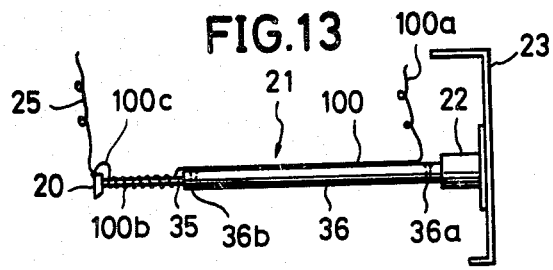
FIG. 13 is an enlarged side view of an essential part of the transducer illustrated in FIG. 12.

A fifth embodiment of the invention will now be described in conjunction with FIGS. 12 and 13. The present embodiment is an improvement of the first embodiment illustrated in FIG. 2. In FIGS. 12 and 13, those parts which are the same as corresponding parts in FIGS. 2 and 6D are designated by like reference numerals, and detailed description of such parts will not be repeated.

Figure 2:
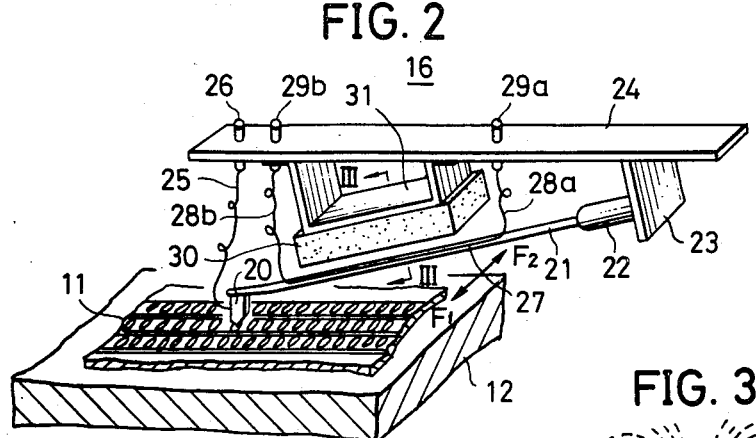
FIG. 2 is a perspective view showing a first embodiment of a reproducing transducer according to invention.

In studying strictly the transducer of the first embodiment illustrated in FIG. 2, the existence of the lead wires 28a and 28b exerts an adverse effect on tracking control efficiency, because the lead wires 28a and 28b through which the control signal current flows exist within the magnetic field formed by the magnet 30. Since the lead wire is not provided with dampers and is very light in weight, in the case where the lead wire oscillates, the oscillating system of the lead wire has a high Q (value designating sharpness of a resonance characteristic). In the case where the same frequency component as the resonance frequency of the oscillating system of the lead wire is included in the control signal, the oscillating system of the lead wire resonates with this frequency component and assumes oscillations of large amplitude quite different from the movement of the cantilever. These oscillations have adverse effects on the tracking control function.

The present embodiment solves the above described problems. The cantilever 21 consists of the glass rod 35 having the reproducing tracing element 20 at the distal end thereof and the aluminium pipe 36 covering the glass rod 35 and caulked thereto at both ends 36a and 36b. A gold wire 100 is bonded to the aluminium pipe 36. A lead wire part 100a of the wire 100 is connected to the terminal 29a. The other part of the wire 100 is wound around the glass rod 35 extending from the aluminium pipe 36 in about 50 turns, for example thereby to form a coil part 100b. An end part 100C of the wire 100 is bonded and electrically connected to the electrode of the reproducing tracing element 20 which is connected to the terminal 26 through the lead wire 25. The other part of the wire 100 may be selected longer and employed instead of the lead wire 25. In this case, the other part of the wire 100 is bonded and connected to the electrode of the element 20, while the end part of the wire 100 is connected to the terminal 26.

Since a frequency band of the control signal and a frequency band of the reproducing video signal are greately different from one another, there arises no obstacle by using a single wire in common for the control signal and the reproducing video signal. The coil part 100b serves as a high frequency blocking coil and has an impedance of about 3 kΩ for a frequency of 1 GHz.

In the present embodiment, the above described problem has been solved, because one of the lead wire parts of the wire 100 does not exist near the magnet 30.

Figure 14:
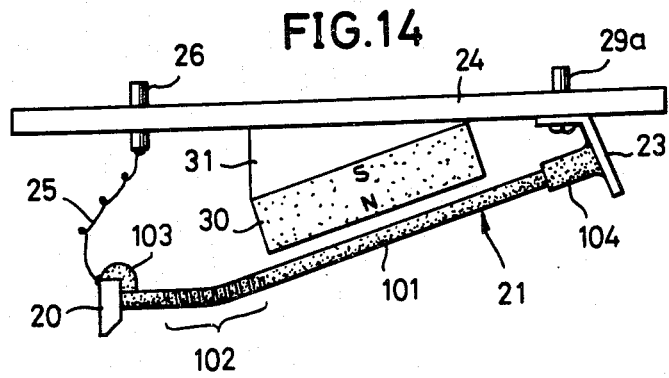
FIG. 14 is a side view showing a modification of the transducer illustrated in FIG. 12.

A modification of the fifth embodiment will be described in conjunction with FIG. 14. Electrically conductive film 101 is formed on the outer surface of the cantilever 21 by sputtering or vapor of the conductive material. A coil part 102 is formed at the cantilever 21 by the electrically conductive film. The end of the coil part 102 is electrically connected to the electrode of the reproducing tracing element 20 by conductive adhesive 103. The proximal end of the conductive film 101 is also formed on a damper 104 and is electrically connected to the terminal 29a. According to this modification, the wire 100 and lead wire part 100a are not needed.

Further, this invention is not limited to these embodiments but various variations and modifications may be made without departing from the scope and spirit of the invention.

What is claimed is:

1. A reproducing transducer in an apparatus for reproducing an information signal recorded on a track on a rotary recording medium, said reproducing transducer comprising;
   a reproducing tracing element for tracing the track on the rotary recording medium to reproduce the information signal;
   a cantilever dampingly supported at a proximal end thereof and provided at a free distal end thereof with the reproducing tracing element;
   means for detecting any deviation of the tracing position of the reproducing tracing element from a proper tracing position relative to the track and generating a tracking control signal in response to the deviation;
   an electric conductor secured to the cantilever and extending along the longitudinal direction of the cantilever;
   means for supplying the current of the tracking control signal to the electric conductor; and
   a permanent magnet spaced from and confronting the electric conductor along the length thereof for applying to the electric conductor a magnetic field in a direction perpendicular to the rotary medium.

2. A reproducing transducer as claimed in claim 1 in which said electric conductor is a conductive wire extending linearly along the longitudinal direction of the cantilever.

3. A reproducing transducer as claimed in claim 1 in which said electric conductor is an electric conductive layer deposited along the longitudinal direction of the cantilever.

4. A reproducing transducer as claimed in claim 1 in which said cantilever comprises a glass pipe provided with the reproducing tracing element at a free distal end thereof and an aluminum pipe covering the glass pipe, said electric conductor being secured to the glass pipe.

5. A reproducing transducer as claimed in claim 1 in which said cantilever comprises a glass pipe provided with the reproducing tracing element at the foremost end thereof and an aluminum pipe covering the glass pipe, said electric conductor being secured to the aluminum pipe.

6. A reproducing transducer as claimed in claim 1 in which said reproducing tracing element has an electrode for detecting a change of electrostatic capacitance between the electrode and the rotary recording medium upon tracing the track of the rotary recording medium; the transducer further comprising a lead wire connected to the electrode, one end of said electric conductor being electrically connected to the lead wire, said current supplying means supplying the tracking control signal current between the lead wire and the other end of the electric conductor.

7. A reproducing transducer as claimed in claim 6 in which said electric conductor includes a coil part for blocking high frequency at one end part thereof.

8. A reproducing transducer in an apparatus for reproducing an information signal recorded on a track on a rotary recording medium, said reproducing transducer comprising:
   a reproducing tracing element for tracing the track on the rotary recording medium to reproduce the information signal;
   a cantilever comprising a glass pipe dampingly supported at a proximal end thereof and provided at a free distal end thereof with the reproducing tracing element, and an aluminum pipe extending along and covering the glass pipe;
   means for detecting any deviation of the tracing position of the reproducing tracing element from a proper tracing position relative to the track and generating a tracking control signal in response to the deviation;
   means for supplying the current of the tracking control signal to the aluminum pipe of the cantilever; and
   a permanent magnet spaced from and confronting the aluminun pipe along the length thereof for applying to the aluminum pipe a magnetic field in a direction perpendicular to the rotary recording medium.

9. A reproducing transducer in an apparatus for reproducing an information signal recorded on a track on a rotary recording medium, said reproducing transducer comprising:
   a reproducing tracing element for tracing the track on the rotary recording medium thereby to reproduce the information signal;
   a cantilever consisting of electrically conductive material along its length dampingly supported at a proximal end thereof and provided at a free distal end thereof with the reproducing tracing element through an insulating material interposed therebetween;
   means for detecting any deviation of the tracing position of the reproducing tracing element from a proper tracing position relative to the track and generating a tracking control signal in response to the deviation;
   means for supplying the current of the tracking control signal to the cantilever; and
   a permanent magnet spaced from and confronting the cantilever along the length thereof for applying to said electrically conductive material of said cantilever a magnet field in a direction perpendicular to the rotary recording medium.

* * * * *